(12) United States Patent
Voyer

(10) Patent No.: US 6,704,578 B2
(45) Date of Patent: Mar. 9, 2004

(54) SYSTEM OF MANAGING THE POWER EMITTED BY A BASE STATION AT THE START OF A HANDOVER PHASE

(75) Inventor: Nicolas Voyer, Rennes (FR)

(73) Assignee: Mitsubishi Electric Information Technology Centre Europe B.V., Rennes (FR)

(*) Notice: Subject to any disclaimer, the term of this patent is extended or adjusted under 35 U.S.C. 154(b) by 411 days.

(21) Appl. No.: 09/725,015

(22) Filed: Nov. 29, 2000

(65) Prior Publication Data

US 2001/0046876 A1 Nov. 29, 2001

(30) Foreign Application Priority Data

Dec. 30, 1999 (FR) ............................................. 99 16848

(51) Int. Cl.$^7$ ................................................. H04B 7/00
(52) U.S. Cl. ........................ 455/522; 455/436; 370/318; 370/331
(58) Field of Search ................................. 455/522, 13.1, 455/442, 436, 437, 439, 226.1, 226.3; 370/335, 514, 316, 318, 319, 320, 321, 331, 332, 334; 375/200, 325

(56) References Cited

U.S. PATENT DOCUMENTS 6,144,861 A * 11/2000 Sundelin et al. ............ 455/522

FOREIGN PATENT DOCUMENTS

WO   WO 99/00914      1/1999
WO   WO 99/31819   *  6/1999   ............ H04B/7/005

OTHER PUBLICATIONS

Torbjörn Andersson, Proceedings of the Vehicular Technology Conference IEEE, vol. CONF. 44, pp. 41–45, "Tuning the Macro Diversity Performance in a DS–CDMA System", Jun. 8, 1994.

* cited by examiner

Primary Examiner—Nay Maung
Assistant Examiner—Tanmay Lele
(74) Attorney, Agent, or Firm—Oblon, Spivak, McClelland, Maier & Neustadt, P.C.

(57) ABSTRACT

A telecommunication system for mobiles of the type which has a network of base stations to which the mobiles can be connected and which is designed so that a mobile connected to a base station sends to the base station, besides user signals, power control commands in order that the base station controls its own transmission power so that the power received therefrom by the mobile is equal to a predetermined value. Each base station to which the mobile is connected regularly transmits, to the base stations to which the mobile is liable to be connected during a handover phase, the mean value of its transmission power. A base station, at the moment of the start of the handover phase, deduces, from the mean value and from the power control commands it receives from the mobile, the instantaneous value of the power emitted by the initial base station or stations at this moment and initializes its transmission power to a value derived from the instantaneous power.

3 Claims, 1 Drawing Sheet

SYSTEM OF MANAGING THE POWER EMITTED BY A BASE STATION AT THE START OF A HANDOVER PHASE

BACKGROUND OF THE INVENTION

1. Field of the Invention

The present invention concerns a telecommunication system for mobiles and, more particularly, a system for managing the power emitted by a base station at the start of a handover phase.

2. Description of the Related Art

A telecommunication system for mobiles according to the present invention is of the type which has a network of base stations to which the said mobiles can be connected and thus be attached. The mobiles can communicate with the network by means of base stations which each delimit a coverage area generally referred to as a "cell". When a mobile passes into the coverage of a new cell, a process, referred to in the art as a "handover process", is used in order that the communication in progress can continue, transparently to the users. To do this, the network has means so that the said mobile connected to at least one so-called initial base station is, during a phase referred to as a handover phase, still connected to the said initial base station or stations and also to another so-called target base station.

Various handover processes are known today. One of them is referred to as "soft" and is used in networks for which the coverage areas of the cells overlap one another. Thus, in this configuration, the mobiles can be in communication at one and the same moment with a number of base stations.

The sole FIGURE depicts a mobile M which is moving (arrows A) from a base station BS1 towards a base station BS2 and which illustrates the soft handover process.

All base stations in the network, a fortiori the depicted base stations BS1 and BS2, send marker signals with one and the same power $P_{TX\_marker}$ which is constant over time. These marker signals are common to all mobiles in the system. There have been depicted the curves of the powers $P_{RX1\_marker}$ and $P_{RX2\_marker}$, received by the mobile M at a respective distance from the base stations BS1 and BS2, of the marker signals respectively sent by the said base stations BS1 and BS2.

The power level of these marker signals received by the mobile M is often used to determine whether this mobile M is situated in the coverage area of each base station.

The handover process may be as follows. The mobile M is initially assumed to be in communication with the base station BS1, referred to as the initial base station. On moving towards the base station BS2, referred to as the target base station, it will find itself in the area covered by the base station BS2. This will be the situation, for example, when the power of the marker signal which it receives from the base station BS2 becomes greater than that which it receives from the base station BS1 by a value of x decibels. It then goes into communication with both base stations BS1 and BS2 (point marked a). Then, when the power of the marker signal received from the base station BS1 becomes less than the marker power received from the base station BS2 by a value y decibels (point marked b), the mobile M abandons the base station BS1 and is therefore only in communication with the base station BS2.

In the area marked I, the mobile is attached only to the base station BS1. In the area marked II, the mobile is attached to both the base station BS1 and the base station BS2 and is said to be in handover phase. In the area marked III, the mobile is attached only to the base station BS2.

A mobile M also receives, from each base station with which it is attached, a user signal, also referred to as a dedicated signal, with a certain received power. For example, in the sole figure, when it is attached to the base station BS1, it receives therefrom a received dedicated signal power $P_{RX1}$. Similarly, when it is attached to the base station BS2, it receives therefrom a received dedicated signal power $P_{RX2}$.

It should be noted that, in handover phase, it receives the dedicated signals from the base stations BS1 and BS2 with a power which is the sum of the received powers $P_{Rx1}$ and $P_{RX2}$. The received powers $P_{Rx1}$ and $P_{RX2}$ are equal to the powers $P_{TX1}$ and $P_{Tx2}$, which are respectively emitted by the base stations BS1 and BS2, decreased by the realizations of the attenuations due to the transmission channels respectively between the base stations BS1 and BS2 and the mobile M.

In telecommunication systems for mobiles, a mobile which is attached to a base station sends to this base station, besides user signals, power control commands in order that the said base station controls its own transmission power $P_{TX}$ so that the power $P_{RX}$ received therefrom is equal to a predetermined value. Thus, according to a known embodiment, when the total power received by the mobile M is either too high or too low, the mobile sends a transmission power control command TPC, either for decreasing or increasing power, to all the base stations to which it is attached in order that the said base stations modify their respective dedicated transmission powers to a correct value, generally a predetermined value.

During the handover phase, the ratio of the powers emitted by the different base stations to which the mobile is attached remains constant. However, during this handover phase, it is important that the powers transmitted by all the base stations to which the mobile is attached are equal, so that a smooth transition can take place on entering and leaving the handover phase. This is because, if the power ratio were not equal to one at the moment of entering the handover phase, the result would be a mismatch which would be retained all through the handover process.

Various solutions could be provided to this problem of matching, during the handover phase, the powers emitted by the base stations to which the mobile is attached.

The first consists of providing a power matching loop. Each base station checks its transmission power and sends back its value to a central management unit. At the moment the mobile enters the handover phase, this central management unit controls the base stations so as to match their respective transmission powers.

One variant would consist of removing the calculation of the transmission power to each base station, the latter then having to know the transmission power of the other base stations to which the mobile is attached.

The problem posed by this solution is that the total time for sending back the power value from each base station to the central management unit, in order to calculate the correct power level, and for returning it to the base stations, is long. During this time, it is possible that the quality of the radio channels between the base stations and the mobile has been altered. The power mismatch which can result therefrom can cause halting of the calls in progress.

Another variant would consist of making provision that the initial base station BS1 to which the mobile is initially attached can measure its own transmission power during a given period, following which it would transmit its value to the target base station BS2. The base station BS2 would then continuously check its own mean transmission power so as to deduce the mismatch between its mean transmission power and that of the other base station BS1. However, in this solution, a certain time is necessary for aligning the transmission power of the target base station BS2. This time can typically be of the order of that of the transmission of the signalling between the base stations, which can be quite high compared with the time for modifying the behaviour of the channel. With the result that, during this period at least, the transmission power of the target base station BS2 is not correct.

Another problem resulting from this method is that the alignment of the dedicated power emitted by the target base station is carried out with an old value of the mean dedicated power transmitted by the initial base station. The true value may be completely different, owing to the signalling transmission delay and the rapid change in the realization of the attenuation due to the transmission channel between the initial base station and the mobile.

Finally, the loop techniques such as just described do not entirely give satisfaction on account of the problems which have been mentioned above.

Another solution would consist of initializing, just before the start of the handover phase, the transmission powers of the base stations to equal values. For example, before the start of the handover phase, the initial base station to which the mobile is initially connected checks its transmission power and transmits its value to the target base station. Next, at the moment when the target base station starts to send to the mobile, it uses the power level corresponding to the value transmitted to it by the initial base station.

The problem of this solution lies in the fact that the transit time of the transmission power level from the initial base station to the target base station may be greater than the time of the fluctuations in the channel. For example, when the target base station BS2 starts to send, the power level of the initial base station BS1 may have changed, notably on account of power control commands TPC sent very frequently. This results in mismatches between the transmission power levels of the two base stations BS1 and BS2.

SUMMARY OF THE INVENTION

The aim of the present invention is to propose a telecommunication system for mobiles which makes it possible to solve the problems mentioned above, and thus to equalize the transmission powers of the different base stations involved in the handover phase, during the whole duration of this phase.

To that end, a telecommunication system for mobiles according to the present invention is characterised in that each base station to which the said mobile is connected regularly transmits, to the base stations to which the said mobile is liable to be connected during a handover phase, the mean value of its transmission power, and in that a base station, at the moment of the start of the handover phase, deduces, from the said mean value and from the said power control commands it receives from the said mobile, the instantaneous value of the power emitted by the said initial base station or stations at this moment, initializing its transmission power to a value derived from the said instantaneous power.

According to another characteristic of the invention, in a telecommunication system for mobiles for which the said power control commands are commands for increasing or decreasing power by a given value, the target base station deduces the instantaneous value of the power emitted by each initial base station at the moment of the start of the handover phase, by adding the mean value of the power emitted by each initial base station as received from the said initial base station to an estimate of the instantaneous deviation between the mean value of this dedicated power and the instantaneous realization of this dedicated power.

According to another characteristic of the invention, the estimate of the instantaneous deviation between the mean value of the dedicated power and the instantaneous value of the dedicated power is advantageously determined as being the difference between the integrated value of the said received commands between a time of reception by the target base station of the command for starting the handover phase and the time of starting the said handover phase, and the mean value of this value between the time of reception by the target base station of the command for starting the handover phase and the time of starting the said handover phase.

According to another characteristic of the invention, the said target base station initializes its transmission power to a value equal to the instantaneous value of the power emitted by each initial base station.

According to another characteristic of the invention, each base station transmits the said mean value of its transmission power to each base station via a centralized management device of the said network of base stations.

Figure 1:
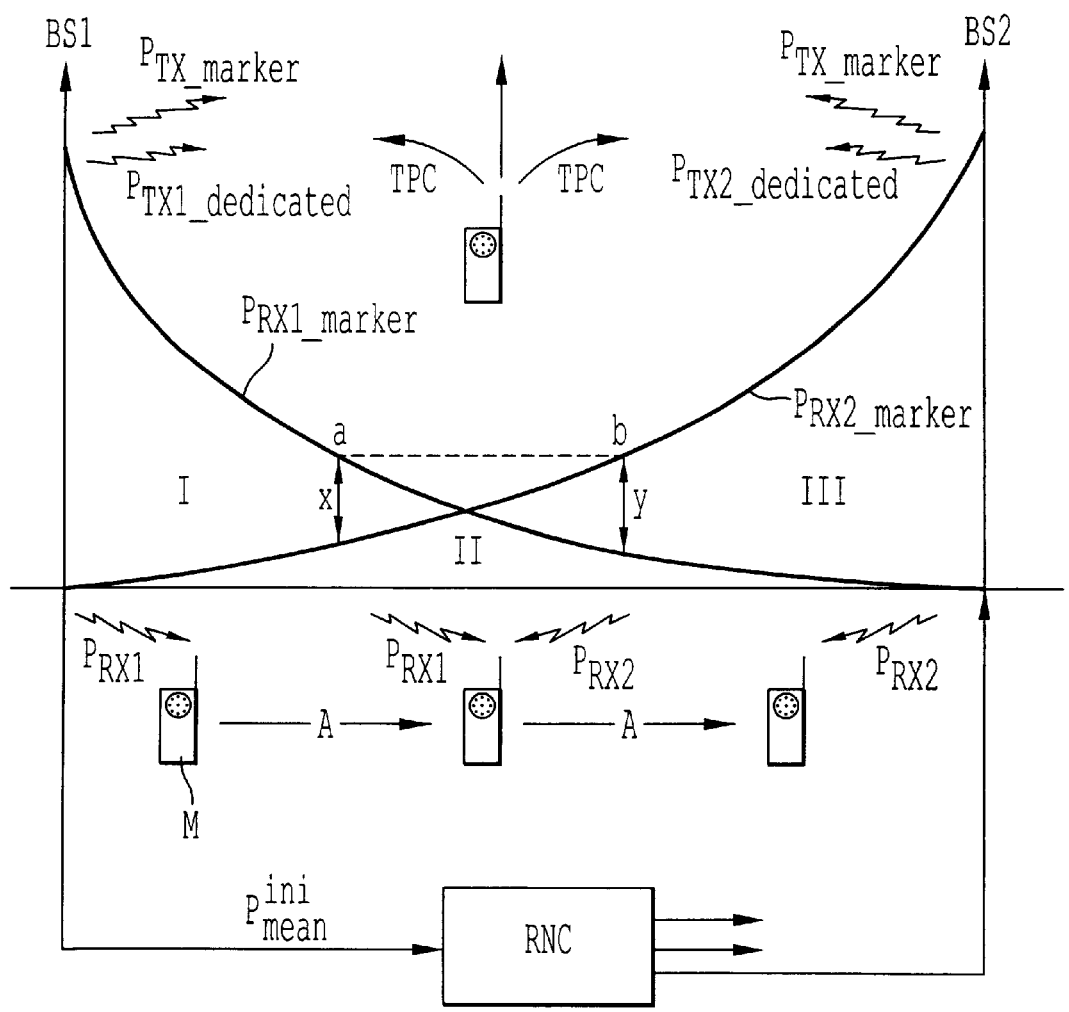
FIG. 1 depicts signal conditions in a radio network according to the present invention.

The characteristics of the invention mentioned above, as well as others, will emerge more clearly from a reading of the following description of an example embodiment, the said description being given in relation to the accompanying drawing which is a diagram showing a mobile in communication with an initial base station, and then in communication with two base stations during a handover phase.

DETAILED DESCRIPTION OF THE INVENTION

The present invention is used in a telecommunication network for mobiles with automatic control of the power emitted by the base stations. To do this, each mobile in communication with a base station sends, to the latter, power control commands TPC so that the power it receives from the said base station is equal to a predetermined value (see sole FIGURE).

For example, according to a generally used method, when the power it receives is less than this predetermined value, it transmits a power increase command TPC. Conversely, when the power it receives is greater than this predetermined value, it transmits a power decrease command TPC.

According to the present invention, the initial base station or each of the initial base stations to which the mobile is initially connected monitors its own dedicated transmission power $P_{Tx1\_dedicated}$ towards the said mobile M and regularly transmits its mean value $P_{mean}^{ini}$ to all the base stations liable to be involved in a handover phase mean with this mobile M. This transmission can be carried out by means of a radio network controller (RNC). This is the case in the example depicted in the sole figure where the initial base station BS1 transmits the mean value $P_{mean}^{ini}$ of its dedicated transmission power $P_{TX1\_dedicated}$ to the target base station BS2 via the RNC.

As for these target base stations, they receive, from the mobile M, the control commands TPC normally intended for the initial base station BS1.

From these control commands TPC, they can determine, at each instant t, the deviation $\Delta(t)$ between the instantaneous power $P_{TX1\_dedicated}$ and the mean transmission power $P_{mean}^{ini}$ of the initial base station BS1 and hence deduce, still at each instant t, the instantaneous transmission power $P_{TX1\_dedicated}$ of the initial base station BS1. At the start of the handover phase at the time $t_h$, the target base station BS2 then initializes its transmission power $P_{TX2\_dedicated}$ to a value derived from the said instantaneous power thus deduced, advantageously to a value identical to the deduced instantaneous power of the initial base station ($P_{TX2\_dedicated}$=deduced $P_{TX2\_dedicated}$).

An example embodiment is now explained where the control commands TPC are commands for increasing or decreasing transmission power.

It is considered that each target base station liable to be involved in this handover phase with the mobile M which is sending the control commands TPC (a fortiori the base station BS2) receives, at an instant $t_0$, from the network, a handover phase start command. In the introductory part of the present description, it is described how such a command may be generated.

From this instant $t_0$, each target base station integrates the control commands TPC sent by the mobile M and thus obtains an integration signal S(t) which represents, to within an unknown constant, the instantaneous dedicated transmission power $P_{TX1\_dedicated}(t_0)$ of the or each initial base station BS1 at the moment $t_0$ at which the target base station concerned BS2 receives the handover phase start command. The value of this integration signal S(t) at each instant t can be written as follows:

$$S(t) = \int_{t_0}^{t} TPC = P_{TX1\_dedicated}(t) - P_{TX1\_dedicated}(t_0)$$

At each instant t, each target base station can make an estimate of the instantaneous deviation $\Delta(t)$ between the mean value $P_{mean}^{ini}$ of the dedicated power emitted by the initial base station BS1 and the instantaneous realization $P_{Tx1\_dedicated}$ of this dedicated power. This deviation $\Delta(t)$ is equal to the difference between the instantaneous value of the integration signal S(t) and the mean of the same integration signal S(t). Consequently, the following can be written:

$$\Delta(t) = S(t) - E(S(t)) = S(t) - \frac{1}{t-t_0}\int_{t_0}^{t} S(t)$$

$$= \int_{t_0}^{t} TPC - \frac{1}{t-t_0}\int_{t_0}^{t}\int_{t_0}^{\tau} TPC$$

where t is an integration variable.

At the start of the handover phase at the time $t_h$, the target base station (for example the base station BS2) then determines the deviation $\Delta(t_h)$. Then it calculates the instantaneous value of the dedicated transmission power $P_{inst}^{ini}$ emitted by the initial base station BS1 as received, by the target base station BS2, from the said initial base station BS1. The following can therefore be written:

$$P_{inst}^{ini} = P_{mean}^{ini} + \Delta(t_h)$$

Finally, it initializes its own transmission power $P_{inst}^{target}$ to a value derived from the value thus calculated, advantageously to a value equal to the value thus calculated. The following can therefore be written, in the latter case:

$$P_{transmission}^{target} = P_{inst}^{ini}$$

It should be noted that the method of the present invention is not sensitive to the transit time of the transmission power information from the initial base station to the target base stations inasmuch as it is considered that the fluctuations over time of this mean power are small.

What is claimed is:

1. A telecommunication system for mobiles having a network of base stations to which the mobiles can be connected, wherein a mobile connected to one base station of the network of base stations sends to the one base station user signals and power control commands in order that the one base station controls its own transmission power so that the power received therefrom by the one mobile is equal to a predetermined value, the telecommunications system also having means so that the mobile connected to at least one initial base station is, during a handover phase, still connected to the at least one initial base station and to target base station, comprising:

each base station to which the mobile is connected regularly transmits to the-a subset of base stations to which the mobile is liable to be connected during a handover phase, a mean value of its transmission power; and one of the subset of base stations, at the moment of the start of the handover phase,
deduces, from the mean value and from the power control commands it receives from the mobile, an instantaneous value of power emitted by the at least one initial base station at this moment, and
initializes its own transmission power to a value derived from the instantaneous power, wherein the value includes an offset equal to a difference between
an integrated value of the received commands, between a time of reception by the target base station of the command for starting the handover phase and the time of starting the handover phase, and
a mean value of the integrated value, between the time of reception by the target base station of the command for starting the handover phase and the time of starting the handover phase.

2. The system according to claim 1, wherein:
the target base station initializes its transmission power to a value equal to the instantaneous value of the power emitted by each initial base station.

3. The system according to claim 1, wherein:
each base station transmits the mean value of its transmission power to the subset of base stations via a centralized management device of the network of base stations.

* * * * *

UNITED STATES PATENT AND TRADEMARK OFFICE
CERTIFICATE OF CORRECTION

PATENT NO. : 6,704,578 B2
DATED : March 9, 2004
INVENTOR(S) : Voyer

It is certified that error appears in the above-identified patent and that said Letters Patent is hereby corrected as shown below:

<u>Title page,</u>
Item [73], Assignee, should read:
-- [73]  Assignee:  Mitsubishi Denki Kabushiki Kaisha, Tokyo (JP) --

Signed and Sealed this

First Day of June, 2004

JON W. DUDAS
*Acting Director of the United States Patent and Trademark Office*